United States Patent
Johnston

(10) Patent No.: US 6,775,948 B2
(45) Date of Patent: Aug. 17, 2004

(54) COAL-BASED ORGANIC GROWTH COMPOUND

(75) Inventor: Robert J. Johnston, Emlenton, PA (US)

(73) Assignee: Soil Energizer, L.P., Emlenton, PA (US)

( * ) Notice: Subject to any disclaimer, the term of this patent is extended or adjusted under 35 U.S.C. 154(b) by 320 days.

(21) Appl. No.: 10/076,313

(22) Filed: Feb. 19, 2002

(65) Prior Publication Data

US 2002/0108416 A1 Aug. 15, 2002

Related U.S. Application Data

(62) Division of application No. 09/605,718, filed on Jun. 27, 2000, now Pat. No. 6,391,078.

(51) Int. Cl.⁷ .............................................. A01B 79/02
(52) U.S. Cl. ..................................... 47/58.15 C; 71/24
(58) Field of Search ................... 47/1.01 R, 58.1 R, 47/58.1 SC; 71/11, 24, 27; 405/258.1, 263, 264, 265; 523/132

(56) References Cited

U.S. PATENT DOCUMENTS

| | | | |
|---|---|---|---|
| 3,766,685 A | 10/1973 | Nickerson | 47/37 |
| 3,770,411 A * | 11/1973 | Chambers et al. | 71/24 |
| 3,888,418 A * | 6/1975 | Seith et al. | 239/145 |
| 4,067,716 A * | 1/1978 | Sterrett | 71/24 |
| 4,235,562 A * | 11/1980 | Ribas | 405/129.2 |
| 4,297,810 A * | 11/1981 | Hansford | 47/9 |
| 4,529,434 A | 7/1985 | Ashmead | 71/34 |
| 4,541,857 A | 9/1985 | Snively | 71/24 |
| 4,928,427 A * | 5/1990 | Patterson | 47/48.5 |
| 4,985,060 A * | 1/1991 | Higa | 71/6 |
| 5,012,974 A | 5/1991 | Johnson | 239/1 |
| 5,013,349 A * | 5/1991 | Tanaka | 71/27 |
| 5,302,524 A * | 4/1994 | Van De Venter et al. | 504/324 |
| 5,409,508 A * | 4/1995 | Erickson | 47/1.01 R |
| 5,608,989 A * | 3/1997 | Behrens | 47/65.9 |
| 5,738,623 A | 4/1998 | Kostka et al. | 588/249 |
| 5,917,112 A * | 6/1999 | Van Stephoudt | 71/31 |
| 6,391,078 B1 * | 5/2002 | Johnston | 71/24 |
| 6,458,179 B1 * | 10/2002 | Puskarich | 71/11 |

FOREIGN PATENT DOCUMENTS

| | | | |
|---|---|---|---|
| DE | 19514333 | * | 10/1996 |
| GB | 2 178 057 A | | 2/1987 |
| GB | 2234746 | * | 2/1991 |
| JP | 6-145663 | * | 5/1994 |
| JP | 7-26260 | * | 1/1995 |

* cited by examiner

*Primary Examiner*—Peter M. Poon
*Assistant Examiner*—David J Parsley
(74) *Attorney, Agent, or Firm*—Morgan, Lewis & Bockius LLP

(57) ABSTRACT

A bio-degradable plant growth composition consisting essentially of coal particulate, sodium molybdate, linear alcohol alkoxylate, magnesium sulphate, sand or other filler and water.

4 Claims, No Drawings

COAL-BASED ORGANIC GROWTH COMPOUND

This is a divisional of application Ser. No. 09/605,718, filed on Jun. 27, 2000, now U.S. Pat. No. 6,391,078.

The present invention relates to a biodegradable organic growth composition which is based on particulate coal.

BACKGROUND

The plant growth composition of the invention represents an improvement in the formulation described in U.S. Pat. No. 4,541,857, the contents of which are incorporated herein by reference.

U.S. Pat. No. 4,541,857 describes a plant fertilizer composition which comprises a mixture of particulate coal containing releasable plant nutrients, sodium molybdate which serves to release the plant nutrients in a form that plants can use, and one or more auxiliary agents selected from ferric sulfate, magnesium sulfate, sodium chloride, zinc sulfate, zinc chloride, copper sulfate, sulfur, hydrated sodium borate, brunt limestone and cobalt carbonate. The coal particulate has a maximum mesh size of about 100 mesh and comprises from about 50–75 weight percent of the total weight of the composition, the molybdate is present in an amount ranging from 0.001 to 0.100 percent by weight of the composition and the auxiliary agent(s) comprise the balance of the composition.

SUMMARY OF THE INVENTION

As indicated, the present invention provides certain improvements in the compositions described in U.S. Pat. No. 4,541,857. These improvements maintain the useful features of the composition described in the earlier patent but also result in further advantages as detailed hereinafter, including, for example, enhanced growth and yield of plants and expanded applicability and use of the composition.

An important modification in the compositions of U.S. Pat. No. 4,541,857 which the present invention provides is the use of a linear alcohol alkoxylate, e.g. a poly(ethylene oxide) ether with a $C_{12}$–$C_{15}$ linear primary alcohol.

Other essential features of the present composition include the use of a substantial amount of sand and a small amount of water. Further features will also be evident from the more detailed description of the invention which follows.

DETAILED DESCRIPTION OF THE INVENTION

The plant growth composition of the invention consists essentially of the following components:

(1) 40–80%, preferably 70–80%, by weight of particulate coal;
(2) 0.01 to 1%, preferably 0.5 to 1%, by weight of sodium molybdate;
(3) from 0.2 to 2% by weight water;
(4) from 0.1 to 1% by weight of linear alcohol alkoxylate;
(5) from 0.001 to 4% by weight of magnesium sulfate; with
(6) the balance, usually in an amount of about 20–60% by weight of the overall composition, being sand.

The composition thus consists primarily of coal and sand in its preferred embodiment although molybdate, linear alcohol alkoxylate, magnesium sulfate and water, within the limits indicated, are also essential for the success of the invention.

Of the indicated components, the coal particulate is advantageously as described in the earlier U.S. Pat. No. 4,541,857 referred to above. Thus, the coal particulate may be of any type, for instance, anthracite, bituminous, sub-bituminous or lignite, and can be of varying quality all of which generally contain from about 0.5 to 3.0 percent of known nitrogen. Other plant nutrients present in coal and made available for use by plants in accordance with the present invention include iron, phosphorus, potassium, sulfur or sulfates, calcium, chloride and at least traces of manganese, copper, boron, cobalt, alumina and selenium. High sulfur content coal has been found to be particularly advantageous.

Advantageously, the coal is of 100 mesh particulate size or smaller, i.e. it is such that it passes through a 100 mesh Tyler Screen. Larger and smaller sizes can be effectively used ranging from, for example, −50 mesh to about −300 mesh. Particles larger than 100 mesh, however, tend to release plant nutrients more slowly. Hence, it is preferred to use a coal particulate of 100 mesh size or finer, i.e. particles which will pass through a 100 mesh Tyler Screen.

While any type of coal can be used, preferably one of high sulfur content, the coal composition specifically exemplified in U.S. Pat. No. 4,541,857 may be cited as typical for use herein. Such coal, on a dry basis, has the following ultimate analysis:

| | |
|---|---|
| carbon: | 73.19% |
| hydrogen: | 5.05% |
| nitrogen: | 1.32% |
| chlorine: | 0.07% |
| sulfur: | 4.50% |
| ash: | 6.00% and |
| oxygen: | 9.87% |

This composition can also be defined on a mineral analysis-ignited basis as follows:

| | |
|---|---|
| phosphorus pentoxide: | 0.26% |
| silica: | 32.95% |
| ferric oxide: | 33.09% |
| alumina: | 22.13% |
| titania: | 0.68% |
| lime: | 2.66% |
| manganese: | 0.52% |
| sulfur trioxide: | 3.24% |
| potassium oxide: | 1.43% |
| sodium oxide: | 0.51% and |
| undetermined: | 2.53% |

As explained in U.S. Pat. No. 4,541,857, the sodium molybdate appears to function in some way to digest the coal particulate and to release plant nutrients from the particulate in a way which enables plants to effectively and advantageously use these nutrients. While the amount of molybdate can be varied and may in some instances fall outside the ranges earlier stated, depending on the nature and size of the coal particulate, best results appear to be obtainable when the molybdate content is in the range of 0.5–1% by weight of the total composition. More than this preferred amount can be used although it is believed that effective digestion of the coal is realized by using the molybdate in the amount indicated.

The linear alcohol alkoxylate is preferably a primary linear $C_{12}$ to $C_{15}$ alcohol, e.g. dodecyl alcohol or mixture thereof with other $C_{12}$–$C_{15}$ alcohol, which has been ethoxylated, i.e. a polyethylene oxide ether of a primary linear alcohol, preferably a primary alcohol of 12–15 carbons. A preferred linear alcohol alkoxylate for use herein is available commercially as "Basic H" surfactant. This material, or its equivalent, may be used for present purposes.

As indicated, the composition should also contain a small amount of water, usually not more than about 2% by weight. It appears that this small amount of water facilitates the effect of the alkoxylate and also seems to help activate the plant growth elements of the coal component.

Any convenient source of sand may be used. The amount of sand employed can be varied and will depend, at least to some extent, on the nature and composition of the coal component, and the amounts of other materials present. However, generally speaking, the amount of sand in the composition will fall within the range earlier stated herein, i.e. 20–60% by weight.

Optimum results appear to be obtained with sand which includes small amounts, e.g. 0.001 to 0.01% by weight, of magnesium sulfate, copper sulfate and other similar trace metal sulfates.

In addition to any magnesium sulfate which may be included in the sand, it is useful to add magnesium sulfate in an amount of from 0.001 to 4% by weight of the composition.

The composition may be prepared in any convenient fashion. Preferably, however, the coal and sand are uniformly mixed together after which the sodium molybdate, alkoxylate and magnesium sulfate, in water are sprayed over the coal/sand mixture while stirring to insure uniformity. The product is then allowed to dry after which it may be bagged for later use or applied directly to the soil at the place of use.

As an alternative, the mixture of coal and sand may be placed at the site of use, e.g. around the base of a fruit tree, after which an aqueous mix of molybdate and alkoxylate is sprayed over the coal/sand mix. The magnesium sulfate may be included in the aqueous spray of alkoxylate and molybdate or it may be included in the coal/sand mix.

In a typical preparation, 1 to 4 ounces of sodium molybdate and up to 1 gallon of the alkoxylate, with or without magnesium sulfate, are mixed with 50 gallons, more or less, of water to form a spray mixture. This mixture is then sprayed over a dry mix of coal particulate and sand and magnesium sulfate. Advantageously the mixture of molybdate and alkoxylate in water is sprayed over a dry mix of coal, sand and magnesium sulfate after the dry mix has been applied to the field or soil where plant growth is desired although, as earlier noted, the entire composition, including the molybdate and alkoxylate, can be prepared before application to the field or soil. Whether pre-formed or prepared in situ, it appears that the spray of molybdate and alkoxylate helps to activate the nutrients or growth elements in the coal.

The composition of the invention is usable under most, if not all, soil conditions globally. An important advantage of the invention, as shown below, is that the composition appears to be able to convert soil which is unsatisfactory for agricultural purposes into soil which is highly useful. In extensive testing, the product has consistently exceeded yield by 50–100% per acre production as measured against conventionally available N—P—K fertilizers which are in common usage.

The invention is illustrated by the following examples:

EXAMPLE 1

70 lbs. of high-sulfur coal were pulverized to a particle size of –100 mesh and mixed with 25 lbs. of sand and 4 lbs. of magnesium sulfate. The resultant mix was then placed around the base of peach trees, untilled, growing in clay soil in Western Pennsylvania in the spring. Clay soil and the Western Pennsylvania climate are not generally favorable for growing peaches. The trees had been barren for 8 years.

After the dry mix was spread (not plowed) around the trees, the mixture was sprayed with a liquid composition comprising 50 gallons of water, 1 gallon Basic H type (polyethylene oxide ether of $C_{12}$–$C_{15}$ primary alcohols) and 4 ounces of sodium molybdate. No pesticides, herbicides, insecticides or fungicides were used. The resulting peaches appeared to be flawless with excellent rich color and superior taste. The yield over the growing period (about 4 months) was so large per tree that wooden support stakes had to be used to prop the trees up under the weight of the fruit crop.

EXAMPLE 2

Example 1 was repeated except that, in this case, the composition was used with 30 year old apple trees which were past their prime and growing in clay soil in Pennsylvania. Although in this case the apple trees had previously borne fruit, the yield had been sparse. About 100 pounds of the composition spread around the base of the tree followed by spraying with the liquid mixture referred to in Example 1. The composition was applied around the trees in April. The trees blossomed in May and bore fruit by late summer. The yield of apples obtained was greatly increased over past years. The quality of the apples was also outstanding.

EXAMPLE 3

Improvements in yield, quality and size were also obtained when the experiment of Example 2 was repeated with stonehead cabbages grown in the same Pennsylvania clay soil. The expected normal cabbage diameter was about six inches. However, by applying the composition to the soil in the spring immediately after planting, cabbages that were fourteen inches in diameter were consistently obtained by mid-summer. Insect damage was essentially non-existent although no pesticide was applied. The indicated results were obtained notwithstanding the fact that weeds were intentionally not removed and consequently competed with the cabbage for soil nutrients.

It was noted, in conducting the tests referred to in the foregoing Examples, that earthworms tended to arrive during crop growth and remained in the soil, thereby functioning to nutritionally enrich the soil.

EXAMPLE 4

The growth composition of Example 1 was compared with a commercially available N—P—K fertilizer in a 24 acre corn field test. The field had been unusable for 40 to 50 years. It was located on a mountain and had 1 inch of soil before shale rock was encountered, representing the worst type of field test conditions. It was estimated that 4000 lbs. of limestone, 120 pounds of nitrogen and 180 pounds of phosphorus would have to be used on each acre to effectively grow corn on the site. However, it was decided to use only about 200 pounds per acre of the present composition with no lime.

Photographs were taken periodically. The N—P—K corn field, comprising a four-acre plot, failed as expected. No crop resulted on any of the four acres with stunted ears of shriveled "bread and butter" corn seen only sporadically. This was typical of prior results.

The adjoining portion of the test field, separated from the N—P—K corn plot by only 12 yards, involved 20 acres using a growth composition according to Example 1. All 20 acres yielded useful corn plants some of which stood 104 inches high. The crop was a complete success yielding an average of 100 bushels of perfectly shaped "bread and butter" corn per acre for each of the 20 test acres whereas, in the past, using lime and N—P—K fertilizer, the total yield was 50 bushels of corn for the entire 24 acre field. No pesticides or herbicides were used in the experiment, no stock damage or discoloration occurred; and the kernels of corn were found to be in perfect rows. Furthermore, in addition to the greatly increased yield per acre, significantly less growth composition according to the invention was used on the 20 acre tract than on the 4 acre failed N—P—K field.

The results of Example 4 indicate that the growth composition of the invention can be used for the production of corn on underused or farm lands which would otherwise be considered too poor to be useful. Such production could be highly valuable in, for example, ethanol production.

It will be appreciated that the amount of the present composition which is applied to the soil can be widely varied. It has been found that the application of 200 pounds of the composition, e.g. the composition of Example 1, per acre is usually effective to give the desired results. More or less than this amount can be used, the optimum amount for any particular situation being readily determined by varying the application and observing the results. The use of from about 100 to 300 pounds, or more, per acre is generally sufficient to obtain the desired results with something around 200 pounds per acre being preferred.

While the invention has been shown in the foregoing examples to improve the yield of fruit (apples and peaches), corn and cabbage, the invention is not limited to such fruits or vegetables. Similar improved results have been obtained with, for example, tomatoes, hay, alfalfa or the like. In another application of the invention, the composition has been used to grow effective grass cover over ground made bare by coal mine stripping. In that particular situation, it had previously been impossible to provide ground cover as required by state and Federal authorities. The composition of the invention was sprayed as an aqueous spray (hydroseeded) with grass seed over the ground and, in about two weeks time, complete ground cover was obtained.

Analysis of a composition according to the invention as used in the foregoing examples for percent solids, volatile solids, total carbon (Total C), total nitrogen (Total N), organic nitrogen (Org-N), ammonium nitrogen ($NH_4$—N), phosphorus (P), potassium (K), magnesium (Mg), calcium (Ca), sodium (Na), cadmium (Cd), chromium (Cr), copper (Cu), lead (Pb), nickel (Ni), zinc (Zn) and boron (B) has given the following results:

| Major Constituents (all values in percent by mass ± standard deviation) | |
|---|---|
| Solids | 95.9 ± 0.14 |
| Volatiles | 35.8 ± 4.7 |
| Total C | 22.7 ± 1.1 |
| Total N | 4.98 ± 0.16 |
| Org N | 3.17 ± 0.35 |
| $NH_4$—N | 1.82 ± 0.50 |
| P | 2.1 ± 0.33 |
| K | 5.6 ± 0.69 |
| Mg | 2.1 ± 0.11 |
| Ca | 6.6 ± 0.35 |
| Na | 029 ± 0.02 |
| Fe | 0.63 ± 0.02 |
| Al | 2.1 ± 0.16 |
| Mn | 0.31 ± 0.02 |

Trace Elements (all values in mg/kg or ppm ± standard deviation)

| -continued | |
|---|---|
| Cd | 0.46 ± 0.02 |
| Cr | 49.85 ± 4.59 |
| Cu | 9.35 ± 0.35 |
| Pb | 42.15 ± 2.05 |
| Ni | 1.5 ± 014 |
| Zn | 33.5 ± 2.19 |
| B | 184 ± 13 |

The Mo content was not determined in the analysis.

Based on the foregoing analysis, the composition could be viewed as a 5-5-7 (N—P—K) composition where N is presented as % N, P is presented as % $P_2O_5$ and K is presented as % $K_2O$, as is typical for fertilizer assays. The precise formulation is 5-4.8–6.8. Therefore, 10 dry tons of this material will supply 100 lbs. of Total N, and 2.4 dry tons of the material will supply 100 lbs. of P. None of the trace elements are present at concentrations that would pose a concern for land application of this material as a fertilizer. Although Cr, Pb and Zn concentrations are greater than 10 ppm, these values are not any higher than one would measure in unpolluted (pristine) soils because these elements are present in rock materials as well. The high concentration of organic C and N indicates that addition of the material to soil would increase the organic matter content of the soil, resulting in an overall improvement in soil quality, over and above that resulting from an equivalent amount of nutrient addition alone.

It will be appreciated from the foregoing that the composition of the invention offers a number of important advantages. For one thing, the composition, in addition to improving crop yields and functioning in less than optimum soil conditions, has the direct effect of enriching soil, not depleting it. As is well known, the use of N—P—K fertilizer has the opposite effect. Soils throughout the world have been severely depleted of nutrients, and polluted by the use of insecticides, herbicides, pesticides and fungicides over centuries of usage but especially during the past 50 years. Excessive, repeated and ever-increasing amounts of N—P—K (nitrogen, phosphate and potash) or artificial fertilizer have been required to yield crops from the depleted soil, all at ever-increasing cost and all this occurring while the quality of crops such as corn, tomato, watermelon or other vegetable or fruit, is diminished. Tests with the invention indicate that less of the growth compound is required per acre to match and exceed crop yields from artificial commercial fertilizer blends (N—P—K). Additionally, the present composition appears to minimize the need for pesticides, insecticides, herbicides and fungicides. This has been true with all crops tested from corn to cabbage, tomatoes, melons, peaches, apples, beans and other vegetables. In all testing to date, no pesticides or herbicides have been required or used on the crops. No negative side effects have been observed and, in fact, the opposite appears to be true in the resultant addition of nutrients to the soil and consequent improved crop yield.

In addition to reducing costs while improving plant growth results, the composition of the invention offers a number of other advantages. For example, the invention can be used to reclaim previously unusable soils, e.g. coal strip-mining and deep-mining soil. As a test, the composition of the invention as in Examples 1–4 was applied on the surface of "hot" or acidic soil resulting from a coal mining operation in Pennsylvania. Previous attempts to create ground cover as required by authorities had failed. However, effective ground cover was obtained over the area in about 10 days after application of the present composition.

As will be appreciated from the foregoing, advantages of the present composition include the following: it avoids the use of costly N—P—K fertilizers or the equivalent and the disadvantages of such fertilizers. It eliminates or reduces substantially the need for pesticides, herbicides and fungicides, the composition apparently tending to fend off such pests naturally. It appears to enable and promote more uniform water penetration in the soil making the nutrients released from the coal more available to the plant over a shorter period of time than possible with conventional fertilizers. Additionally, the present composition has no negative effect on soil pH, results in greener plant leaves, promotes sprouting of seeds, increases plant yield, promotes the appearance of earthworms which aid the nutrient enrichment of the soil, promotes larger, taller and thicker plants, crops and plant stalks; promotes more efficient water usage because it retains water in the soil thereby reducing soil erosion, water evaporation and water runoff, while separately promoting drainage in soil areas of excessive water accumulation and promotes water retention during dry weather, but, conversely, helps water leach through the soil in hot or dry weather.

Various modifications may be made in the invention as described above and as define in the following claims wherein.

I claim:

1. A method of reclaiming coal strip-mining or deep-mining soil which comprises applying to said soil an amount of a bio-degradable plant growth composition consisting essentially of coal particulate, sodium molybdate, linear alcohol alkoxylate, magnesium sulphate, sand and water to facilitate plant growth.

2. The method of claim 1 which involves the growth of plants without the use of a pesticide, herbicide, fungicide or insecticide.

3. The method of claim 2 wherein said composition is applied around fruit trees to improve the yield and/or quality of the resulting fruit.

4. The method of claim 2 wherein said composition is applied to soil where vegetables or fruit are grown to facilitate or improve the growth or characteristics of said vegetables or fruit.

* * * * *